US009302693B2

(12) United States Patent
Dixson et al.

(10) Patent No.: US 9,302,693 B2
(45) Date of Patent: Apr. 5, 2016

(54) COILED TUBING SERVICING TOOL (71) Applicant: Halliburton Energy Services, Inc., Houston, TX (US)

(72) Inventors: Kenneth Glenn Dixson, Houston, TX (US); Brian Vandellyn Park, Austin, TX (US); Maximo Gustavo Michaelis, Houston, TX (US); Mikko Jaaskelainen, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 404 days.

(21) Appl. No.: 13/771,628

(22) Filed: Feb. 20, 2013

(65) Prior Publication Data
US 2014/0230229 A1    Aug. 21, 2014

(51) Int. Cl.
*B62B 5/00* (2006.01)
*B23Q 11/04* (2006.01)
*B23G 1/00* (2006.01)
*B23G 1/22* (2006.01)
*B23B 31/20* (2006.01)
*B23B 5/16* (2006.01)
*B23G 1/24* (2006.01)

(52) U.S. Cl.
CPC . *B62B 5/00* (2013.01); *B23B 5/168* (2013.01); *B23B 31/202* (2013.01); *B23B 5/165* (2013.01); *B23G 1/22* (2013.01); *B23G 1/24* (2013.01); *Y10T 29/49998* (2015.01)

(58) Field of Classification Search
CPC  B23B 5/165; B23B 31/202; B23B 29/03482; B23B 5/00; B23G 1/02; B23G 1/22; B23G 1/24; B23Q 1/76; B23D 21/003

USPC ............... 248/127, 121, 129; 82/1.11, 79, 88, 82/113, 118, 151, 90, 98, 100; 470/67, 77, 470/901; 279/6; 83/319; 184/614, 6.14; 29/27 C, 37 T, 559, 26 R, 34 R, 429; 269/151; 408/5, 22, 11
See application file for complete search history.

(56) References Cited

U.S. PATENT DOCUMENTS 2,916,749 A * 12/1959 Ingwer ..................... B23G 1/22
184/6.14
3,274,627 A * 9/1966 Behnke .................... B23G 1/22
470/77
3,631,552 A * 1/1972 Ivester .................... B23B 5/165
82/113

(Continued)

OTHER PUBLICATIONS

Filing receipt and specification for patent application entitled "Coiled Tubing System with Multiple Integral Pressure Sensors and DTS," by Glenn Robert McColpin, et al., filed Feb. 20, 2013 as U.S. Appl. No. 13/771,287.

(Continued)

*Primary Examiner* — Tan Le
(74) *Attorney, Agent, or Firm* — John W. Wustenberg; Baker Botts L.L.P.

(57) ABSTRACT

A coiled tubing servicing system comprising a servicing cart comprising two or more support frames, a length of coiled tubing supported by the servicing cart, a servicing fixture disposed about a portion of the length of coiled tubing adjacent the servicing cart, wherein the servicing fixture is movable along a longitudinal axis of the length of coiled tubing and radially about the longitudinal axis of the length of coiled tubing; and a servicing tool coupled to the servicing fixture.

9 Claims, 4 Drawing Sheets

(56) References Cited

U.S. PATENT DOCUMENTS

| | | | |
|---|---|---|---|
| 6,116,085 A | 9/2000 | Moffatt et al. | |
| 6,938,313 B2* | 9/2005 | Viola | B23B 31/202 82/113 |
| 7,674,079 B2* | 3/2010 | Schawe | B23G 1/02 82/110 |
| 7,717,018 B2* | 5/2010 | Kato | B23B 29/03482 279/6 |
| 8,091,455 B2* | 1/2012 | McKeeth | B23D 21/003 83/319 |
| 8,397,609 B2* | 3/2013 | Miyamoto | B23Q 1/76 82/1.11 |
| 2011/0073210 A1 | 3/2011 | Stretch et al. | |
| 2013/0209029 A1 | 8/2013 | Mitchelll et al. | |
| 2014/0230229 A1* | 8/2014 | Dixson | B62B 5/00 29/559 |

OTHER PUBLICATIONS

Filing receipt and specification for patent application entitled "Method and Device for Installing Multiple Fiber Optic Cables in Coiled Tubing," by Mikko Jaaskelainen, et al., filed Feb. 20, 2013 as U.S. Appl. No. 13/771,332.

Filing receipt and specification for patent application entitled "Method for Installing Multiple Sensors in Coiled Tubing," by Mikko Jaaskelainen, et al., filed Feb. 20, 2013 as U.S. Appl. No. 13/771,355.

* cited by examiner

COILED TUBING SERVICING TOOL

CROSS-REFERENCED TO RELATED APPLICATIONS

Not applicable.

STATEMENT REGARDING FEDERALLY SPONSORED RESEARCH OR DEVELOPMENT

Not applicable.

REFERENCE TO A MICROFINCHE APPENDIX

Not applicable.

BACKGROUND OF THE INVENTION

Coiled tubing may be used in a variety of wellbore servicing operations including drilling operations, completion operations, stimulation operations, and other operations. Coiled tubing refers to relatively flexible, continuous tubing that can be run into the wellbore from a large spool which may be mounted on a truck or other support structure. While a rig must stop periodically to make up or break down connections when running drilling pipe or other jointed tubular strings into or out of the wellbore, coiled tubing can be run in for substantial lengths before stopping to join in another strand of coiled tubing, thereby saving considerable time by comparison to jointed pipe. The coiled tubing is typically run into and pulled out of the wellbore using a device referred to as an injector. As the injector feeds coiled tubing into the wellbore, coiled tubing is unrolled or "paid out" from the coiled tubing spool. As the injector withdraws coiled tubing out of the wellbore, coiled tubing is rolled onto or taken up by the coiled tubing spool.

Conventionally, sensors and/or other equipment may be incorporated within the coiled tubing to communicate temperature, pressure, and/or other data to the surface via data conduits such as electrical wires and/or optical fibers. The data conduits may interface with the operation of surface equipment which collect and store data measurements for various parameters (e.g., pressure, temperature) of the wellbore. For proper operation and reliable data measurements, the sensors need to be accurately and/or safely positioned within the bore of the coiled tubing. Conventional configurations of components (such as sensors) within coiled tubing strings may be difficult or cumbersome to deploy within the coiled tubing. As such, an improved means of preparing a coiled tubing string and/or securing sensors within the coiled tubing string is needed.

SUMMARY OF THE INVENTION

Disclosed herein is a coiled tubing servicing system comprising a servicing cart comprising two or more support frames, a length of coiled tubing supported by the servicing cart, a servicing fixture disposed about a portion of the length of coiled tubing adjacent the servicing cart, wherein the servicing fixture is movable along a longitudinal axis of the length of coiled tubing and radially about the longitudinal axis of the length of coiled tubing; and a servicing tool coupled to the servicing fixture.

Also disclosed herein is a coiled tubing servicing method comprising preparing a length of coiled tubing, preparing a coiled tubing servicing tool comprising the steps of supporting at least a portion of the length of coiled tubing with a servicing cart comprising two or more support frames, disposing a servicing fixture adjacent the supported portion of the length of coiled tubing, wherein the servicing fixture is movable along a longitudinal axis of the length of coiled tubing and radially about the longitudinal axis of the length of coiled tubing, and coupling a servicing tool to the servicing fixture, locating one or more components disposed within the length of coiled tubing, and providing access to the one or more components disposed within the length of coiled tubing.

Further disclosed herein is a coiled tubing servicing method comprising preparing a length of coiled tubing, supporting at least a portion of the length of coiled tubing with a coiled tubing servicing system, preparing the coiled tubing servicing system, wherein the coiled tubing servicing system provides longitudinal and/or radial movement about the length of coiled tubing, locating one or more components disposed within the length of coiled tubing, providing access to the one or more components disposed within the length of coiled tubing.

DETAILED DESCRIPTION OF THE EMBODIMENTS

In the drawings and description that follow, like parts are typically marked throughout the specification and drawings with the same reference numerals, respectively. The drawing figures are not necessarily to scale. Certain features may be shown exaggerated in scale or in somewhat schematic form and some details of conventional elements may not be shown in the interest of clarity and conciseness. Specific embodiments are described in detail and are shown in the drawings, with the understanding that the present disclosure is to be considered an exemplification of principles, and is not intended to limit the claims to the embodiments illustrated and described herein. It is to be fully recognized that the different teachings of the embodiments discussed infra may be employed separately or in any suitable combination to produce desired results.

Disclosed herein are embodiments of a coiled tubing servicing tool (CTST), a coiled tubing servicing system comprising a CTST, and methods of using the same. In an embodiment, a CTST may be employed to perform one or more coiled tubing servicing operations, for example, to provide access to one or more components (e.g., one or more sensors) disposed within a flowbore of a length of coiled tubing. For example, in an embodiment, such a length of coiled tubing may be employed within a wellbore environment for purposes of monitoring such a wellbore. The coiled tubing may be assembled to a given specification (e.g., having a quantity of sensors, types of sensors, sensor locations within the coiled tubing, length of coiled tubing, etc.). In such an embodiment, the plurality of wires, the plurality of sensors and/or other components may be positioned and secured within the length of coiled tubing. Additionally, the length of coiled tubing may require access ports, for example, to expose the sensors to wellbore conditions and/or wellbore fluids. In such an embodiment, the CTST may be used to locate one or more components (e.g., a sensor or other equipment) disposed within a flowbore of a length of coiled tubing and/or to provide access to the components by providing a route of access between the flowbore of the length of coiled tubing and the exterior of the length of coiled tubing. Alternatively, the CTST may be used to machine, to service, to repair, and/or to perform any other suitable coiled tubing servicing operation with respect one or more portions of a length of coiled tubing as would be appreciated by one of ordinary skill in the art upon viewing this disclosure.

Figure 1:
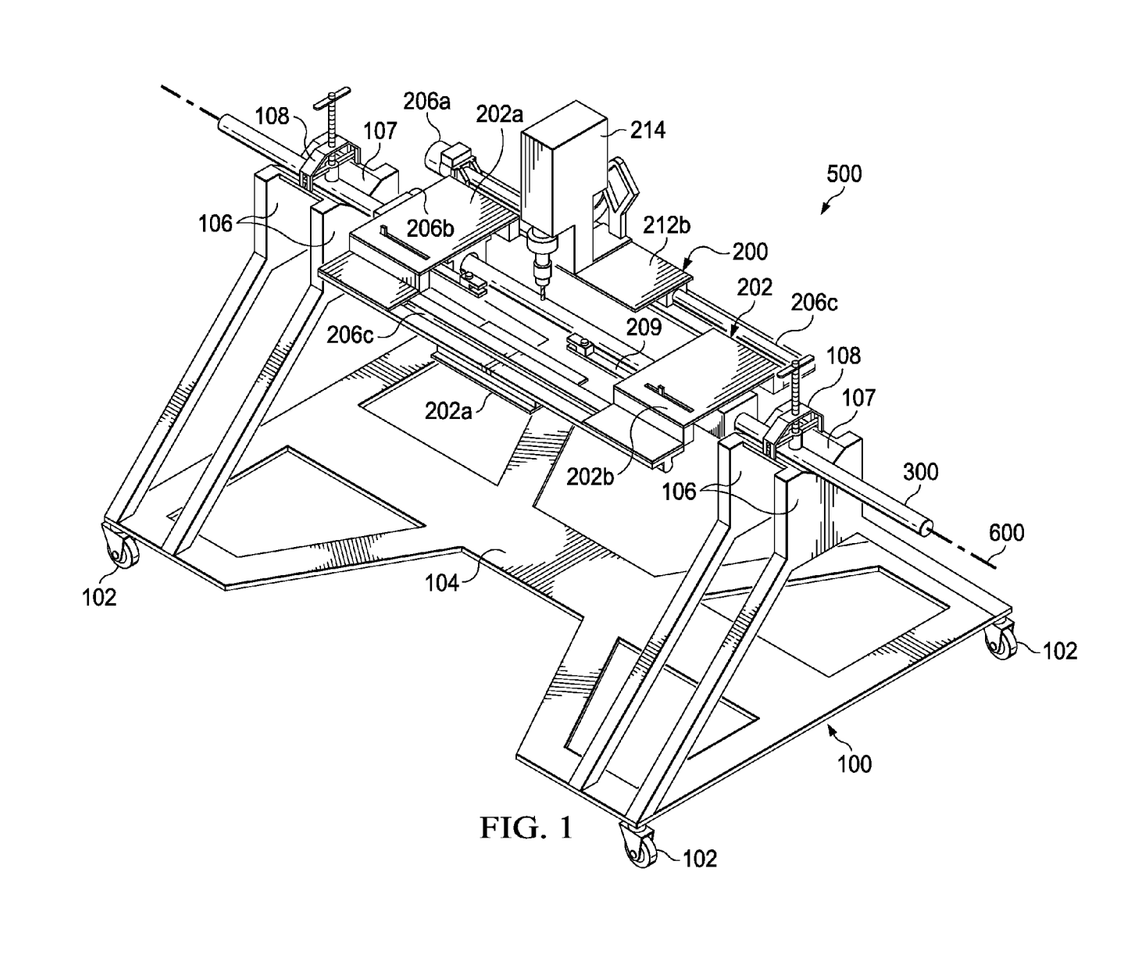
FIG. 1 shows a perspective view of an embodiment of the disclosed coiled tubing servicing tool.

In the embodiment of FIG. 1, the CTST 500 may generally comprise a servicing cart 100 and a servicing fixture 200, as will be disclosed herein.

In an embodiment, the servicing cart 100 may be configured to provide access to a portion of a length of coiled tubing (for example, about 360 degrees of access with respect to the longitudinal axis 600 of the coiled tubing). For example, in the embodiment of FIG. 1, the servicing cart 100 may be configured to suspend, support, and/or secure at least a portion of a length of coiled tubing 300. Additionally, in an embodiment, the servicing cart 100 may be configured to support the servicing fixture 200. In an embodiment, the servicing cart 100 may be configured to be mobile and repositionable along the length of coiled tubing 300, as will be disclosed herein. In an embodiment, as illustrated in FIG. 2, the servicing cart 100 may generally comprise a positioning platform 104 and two or more support frames 106.

In an embodiment, the positioning platform 104 may generally comprise a frame (e.g., a rectangular frame, an H frame, an X frame, etc.), for example, which may be supported by a plurality of wheels 102 (e.g., casters, rollers, etc.). Alternatively, the frame may be supported by a plurality of legs (e.g., adjustable legs or the like). In an embodiment, the positioning platform 104 may be configured to move (e.g., to roll) the servicing cart 100 to and from (and underneath) the length of coiled tubing 300. Additionally, in an embodiment, one or more of the wheels 102 may be configured to be lockable, and thereby substantially restrict the motion of the positioning platform 104.

In an embodiment, the supporting frames 106 may be positioned and/or configured to support a portion of the coiled tubing 300 and/or a servicing fixture 200, as will be disclosed herein. In an embodiment, the supporting frames 106 may be disposed on to the servicing cart 100, for example, about perpendicular to (e.g., upright with respect to) the positioning platform 104. In an embodiment, the servicing cart 100 comprises 2 pairs of supporting frames 106 with each pair of supporting frames 106 having space there between. For example, in an embodiment, the supporting frames 106 may be positioned about two feet from each another, alternatively, about three feet from each another, alternatively, about four feet from each another, alternatively, any other suitable distance from each other as would be appreciated by one of ordinary skill in the art upon viewing this disclosure. Additionally, in an embodiment, the supporting frames 106 may provide suitable clearance to rotate and/or position a servicing fixture about the coiled tubing 300, for example, thereby providing access to the coiled tubing, as will be disclosed herein. In an embodiment, the supporting frames 106 may be configured to have a fixed vertical height, as illustrated in FIG. 2. In an alternative embodiment, the supporting frames 106 may be configured to have an adjustable vertical height. For example, in an embodiment, the supporting frames 106 may comprise one or more telescoping portions (e.g., concentric hydraulic pistons) which telescopically extend to increase the height of the support frames 106 and which telescopically retract to decrease the height of the supporting frames 106. In an additional or alternative embodiment, the supporting frames 106 may be configured to have portions which move with respect to one another via gears, tracks, ratchets, screws, scissors, etc., for example, a vertical height mechanism may be configured to move portions of the supporting frames 106.

Figure 2:
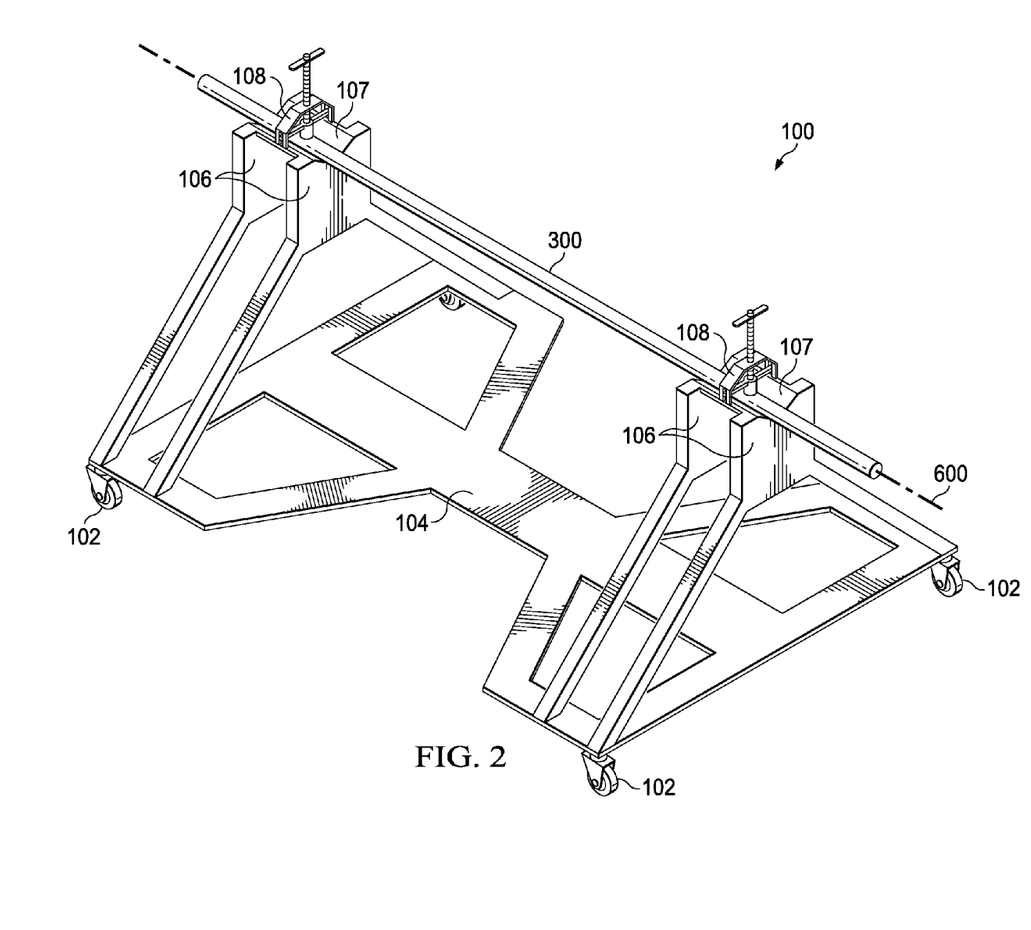
FIG. 2 shows a perspective view of an embodiment of a first portion of a coiled tubing servicing tool comprising a servicing cart.

In an embodiment, as illustrated in FIG. 2, an upper portion of the supporting frames 106 may comprise a pipe guide 107, for example, a groove, a notch, a cradle, a slot, a channel, or any other suitable structure as would be appreciated by one of ordinary skill in the arts upon viewing this disclosure, or combinations thereof. In an embodiment, the pipe guides 107 may be spanning a space between pairs of supporting frames 106 and configured to support and/or to at least partially restrict lateral movement of a portion of the length of coiled tubing 300 with respect to the servicing cart 100. Additionally, in an embodiment, the pipe guide 107 may be configured to interface with a restraining mechanism 108, for example, a threaded pipe clamp, a pipe strap, a hose clamp, a pipe hanger, any other suitable structure as would be appreciated by one of ordinary skill in the arts upon viewing this disclosure, or combinations thereof. In an embodiment, the restraining mechanism 108 may be configured to fix the length of coiled tubing 300 (e.g., to prevent or substantially restrict lateral movement and/or rotation of a portion of the length of coiled tubing 300) with respect to the servicing cart 100. For example, in an embodiment, the service cart 100 may be configured to secure the length of coiled tubing 300 to the supporting frames 106 of the servicing cart 100 via a connection between the pipe guide 107 (e.g., a groove) and the restraining mechanism 108 (e.g., a pipe strap or screw clamp). In an additional or alternative embodiment, the restraining mechanism 108 may be removable from the pipe guide 107 and/or the servicing cart 100. In an additional or alternative embodiment, the restraining mechanisms 108 may be adjustable to restrain coiled tubing of various diameters.

Figure 3A:
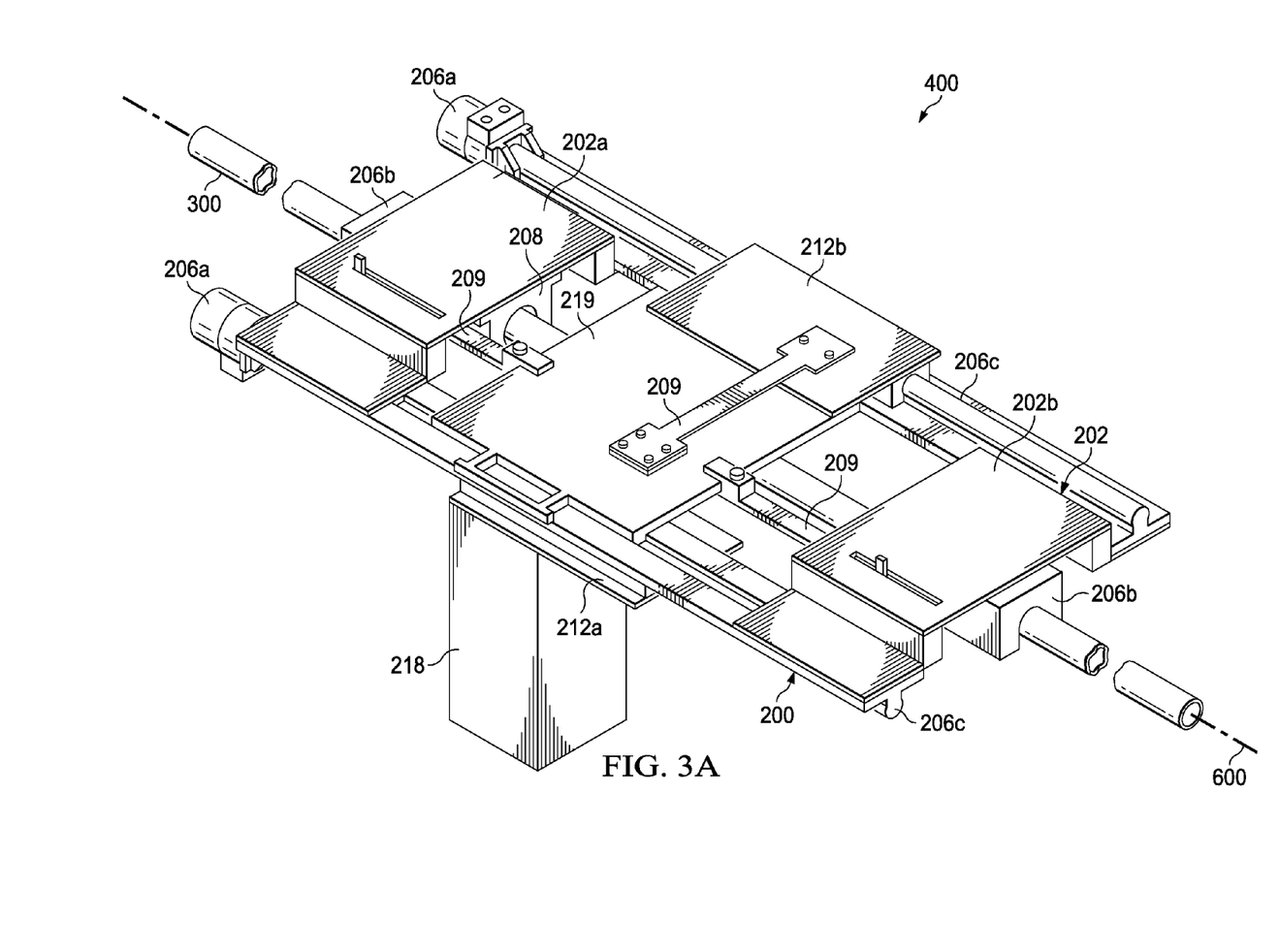
FIG. 3A shows a perspective view of an embodiment of a second portion of a coiled tubing servicing tool comprising a servicing fixture and an x-ray assembly.
Figure 3B:
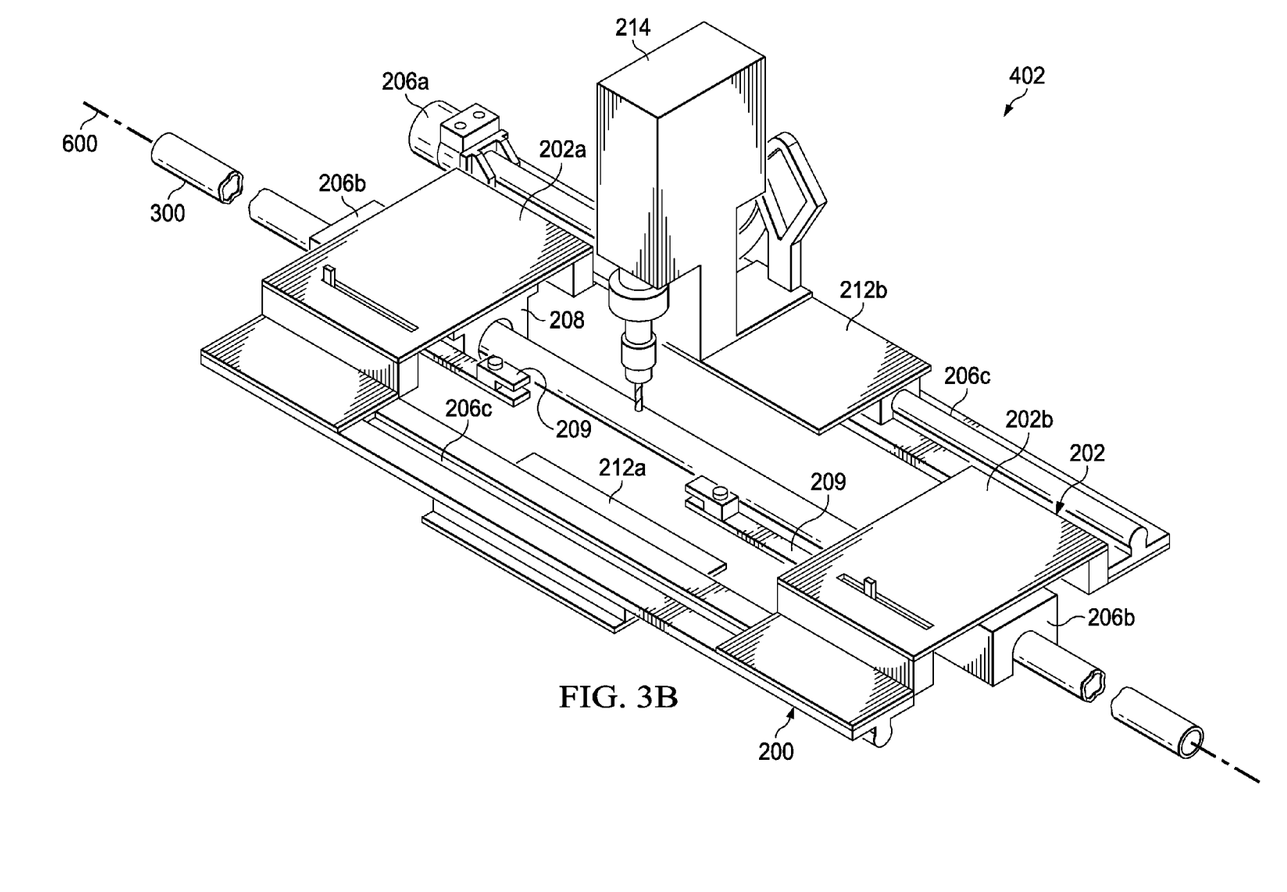
FIG. 3B shows a perspective view of an embodiment of a second portion of a coiled tubing servicing tool comprising a servicing fixture and a drilling assembly.

In an embodiment, the servicing fixture 200 may be generally configured to support and/or position one or more servicing tools, as will be disclosed herein. For example, in the embodiment of FIGS. 3A-3B, the servicing fixture 200 may be configured to position one or more servicing tools (e.g., an x-ray assembly, a drill assembly, etc.) about a portion of the coiled tubing 300 for a coiled tubing servicing operation, as will be disclosed herein. In the embodiment of FIGS. 3A-3B, the servicing fixture 200 may generally comprise a working frame 202, a fixture mount 208, a positioning system 206 (e.g., one or more linear actuators 206a, one or more radial actuators 206b, and one or more rails 206c) and one or more equipment perches 212.

In an embodiment, the working frame 202 may comprise a frame (e.g., a rectangular or square frame) and may comprise one or more surfaces configured to interface with and to couple to the servicing fixture 200 and/or one or more servicing tools, as will be disclosed herein. In an embodiment, the working frame 202 may generally be configured to support one or more servicing tools (e.g., an x-ray assembly, a drill assembly, etc.), the positioning system 206, and/or any other suitable coiled tubing servicing components as would be appreciated by one of ordinary skill in the art upon viewing this disclosure. In an embodiment, the working frame 202 of the servicing fixture 200 may be coupled to and/or fastened to the servicing cart 100 and/or to one or more portions of the length of coiled tubing 300, for example, via one or more fixture mounts 208 (e.g., a plurality of pipe clamps or pipe hangers). In an embodiment, the working frame 202 may be positioned about and/or adjacent to a portion of the coiled tubing 300 and may be configured such that the servicing fixture 200 remains substantially stable and maintains its position relative to the coiled tubing 300 during one or more coiled tubing servicing operations, as will be disclosed herein. For example, in the embodiment of FIGS. 3A-3B, the working frame 202 may be joined to a portion of the coiled tubing 300 via the fixture mounts 208 (e.g., a plurality of split ring pipe hangers). In an alternative embodiment, the working frame 202 may be joined with the servicing cart 100, for example, via a bolted connection between one or more surfaces of the working frame 202 (e.g., the fixture mount 208) and one or more surfaces of the servicing cart 100 (e.g., the supporting frames 106). Alternatively, the working frame 202 may be coupled to the servicing cart 100 and/or coiled tubing 300 by any other suitable methods as would be appreciated by one of ordinary skill in the art upon viewing this disclosure.

In an embodiment, the positioning system 206 may be generally configured to position and/or to rotate the working frame 202 and/or one or more servicing tools about a portion of the coiled tubing 300. In the embodiment of FIGS. 3A-3B, the positioning system 206 may comprise one or more radial actuators 206b, one or more linear actuators 206a, and/or one or more rails 206c.

In an embodiment, the radial actuators 206b may be configured to rotate the servicing fixture 200 with respect to (e.g., about) the coiled tubing 300, for example, as illustrated in FIGS. 3A-3B, about (e.g., 360 degrees clockwise or counter clockwise within a perpendicular or cross-sectional plane) a longitudinal axis 600 of the coiled tubing 300. In an embodiment, the radial actuators 206b may be configured to rotate the servicing fixture 200 about any increment of 360 degrees about (e.g., 360 degrees clockwise or counter clockwise within a perpendicular or cross-sectional plane) the longitudinal axis 600. In such an embodiment, the radial actuators 206b may comprise one or more gears, a DC motor, a servo, a worm drive, a mechanical crank, a belt drive assembly, a chain drive assembly, any other suitable apparatus as would be appreciated by one of ordinary skill in the art upon viewing this disclosure, or combination thereof. For example, in an embodiment, the radial actuators 206b may comprise a plurality of gears and a mechanical crank and may be configured to rotate the servicing fixture 200 about the longitudinal axis 600 with an application of a mechanical force onto the mechanical crank (e.g., via manually actuating the mechanical crank, electronically actuating the crank, etc.).

In an embodiment, the one or more rails 206c may be configured to guide one or more servicing tools and/or components (e.g., an equipment perch supporting an x-ray assembly or drill press) with respect to the coiled tubing 300, for example, along the longitudinal axis 600 for the purposes of positioning the servicing tools with respect to the working frame 200 and/or the length of coiled tubing 300. In an embodiment, the one or more rails 206c may be disposed substantially parallel to the longitudinal axis 600 onto the working frame 202 of the servicing fixture 200. For example, in the embodiment of FIGS. 3A-3B, where the servicing fixture 200 comprises a plurality of rails 206c, the plurality of rails 206c may be disposed substantially parallel along opposing edges and/or opposing surfaces of the working frame 202. In an embodiment, the rails 206c may comprise a track, a groove, a slot, a guide, or anything other suitable guiding structures as would be appreciated by one of ordinary skill in the art upon viewing this disclosure. Additionally, in an embodiment, the rails 206c may be configured to engage with the equipment perches 212 and the working frame 202 (e.g., the first frame end 202a and the second frame end 202b), as will be disclosed herein.

In an embodiment, one or more equipment perches 212 may be configured to couple the one or more servicing tools (e.g., an x-ray assembly, a drilling assembly, etc.) and the working frame 202 of the servicing fixture 200 (e.g., via the one or more rails 206c). Referring to FIGS. 3A-3B, in an embodiment, the working frame 202 may comprise a first frame end 202a and a second frame end 202b one or more equipment perches 212 (e.g., a first equipment perch 212a and a second equipment perch 212b) and the equipment perches 212 may or, alternatively, may not be movable and/or positionable along the longitudinal axis 600 with respect to the working frame 202, as previously disclosed. For example, in an embodiment, the equipment perches 212 may comprise a longitudinal bore or slot suitable for engaging (e.g., sliding along) the rails 206c. In an embodiment, the equipment perches 212 may each comprise a working surface area suitably sized and structured for attaching one or more servicing tools. For example, an x-ray assembly 400 and/or a drilling assembly 402 may be positioned onto the equipment perch 212. Additionally, in an embodiment, the equipment perches 212 may further comprise a suitable mechanism for attaching (e.g., removably) the one or more servicing tools, for example, one or more of the equipment perches 212 may comprise a plurality of threaded bores and may be configured to couple with the one or more servicing tools via a bolted connection between the servicing tool and the plurality of threaded bores of the equipment perch 212. Alternatively, the one or more servicing tools may be coupled to one or more of the equipment perches 212 via a vise, a clamp, one or more straps, latches, grooves, slots, mating mechanisms, and/or any other suitable type and/or configuration as would be appreciated by one of ordinary skill in the art upon viewing this disclosure. In an additional or alternative embodiment, the equipment perches 212 may be configured to counter balance and/or stabilize the servicing fixture 200, for example, a first equipment perch 212 (e.g., equipment perch 212a) may comprise a sufficient mass and/or may be configured to support additional weight, for example, to equalize the mass of one or more servicing tools installed on a second equipment perch (e.g., equipment perch 212b).

Additionally, in an embodiment, the first equipment perch 212a and the second equipment perch 212b may be configured to remain in a fixed position with respect to one another (e.g., substantially aligned) when positioned along the longitudinal axis 600 of the working frame 202. In an additional or alternative embodiment, the first equipment perch 212a and the second equipment perch 212b may be configured to be positioned independently, for example, the first equipment perch 212a may be positioned such that the first equipment perch 212a is not aligned with the second equipment perch 212b. In an embodiment, the first equipment perch 212a and the second equipment perch 212b may be disposed and/or positioned along the same working surface of the working frame 202. Alternatively, the first equipment perch 212a and the second equipment perch 212b may be disposed and/or positioned along opposite working surfaces (e.g. working surface rotated 180 degrees from one another about the longitudinal axis 600), for example, as shown in FIGS. 3A-3B.

In an embodiment, the linear actuators 206a may be configured to move and/or to position the equipment perches 212 along the rails 206c and/or the longitudinal axis 600 with respect to the working frame 202 and/or the length of coiled tubing 300, as will be disclosed herein. In an embodiment, the linear actuators 206a may comprise one or more gears, a DC motor, a servo, a threaded rod, a worm drive, a mechanical crank, a belt drive assembly, a chain drive assembly, a screw-drive, any other suitable apparatus as would be appreciated by one of ordinary skill in the art upon viewing this disclosure, or combination thereof. For example, in an embodiment, the linear actuators 206a may comprise a screw-drive coupled to the equipment perches 212 and may be configured to position the equipment perches 212 along the rails 206c and/or the longitudinal axis 600 with respect to the working frame 202, and/or the coiled tubing 300. In an alternative embodiment, the linear actuator 206a may comprise a mechanical chain drive assembly, a plurality of gears, and a mechanical crank and may be configured to position the equipment perches 212 along the rails 206c and/or the longitudinal axis 600 with respect to the working frame 202, and/or the coiled tubing 300 with an application of a mechanical force onto the mechanical crank (e.g., via manually actuating the mechanical crank, electronically actuating the crank, etc.).

In an embodiment, the CTST 500 may be configured to locate one or more components (e.g., one or more sensors) disposed within the flowbore of the length of coiled tubing 300, for example, the CTST 500 may be configured to employ an x-ray assembly 400. In the embodiment of FIG. 3A, the x-ray assembly 400 may comprise an x-ray source 218 and an x-ray receptor 219. In an embodiment, the x-ray source 218 may be configured to emit x-ray photons to be received by the x-ray receptor 219, for example, for the purpose of generating an x-ray image, as will be disclosed herein. For example, in an embodiment, the x-ray source 218 may comprise a non-radioactive digital x-ray source and may be configured to capture continuous x-ray images in about real-time. In an alternative embodiment, the x-ray source 218 may be configured to capture a series of x-ray images at predetermined intervals of time, for example, about every second. In an embodiment, the x-ray source 218 may be attachable to the servicing fixture 200 (e.g., via the connection to a first equipment perch 212a) and may be positioned adjacent to or about the length of coiled tubing 300. In an embodiment, the x-ray receptor 219 may be configured to receive x-ray photons emitted by the x-ray source 218. For example, in an embodiment, the x-ray receptor 219 may comprise a digital imager. In an embodiment the image receptor may be configured to be supported and/or retained in a substantially fixed position, for example, via a connection with a second equipment perch 212b and/or one or more supporting arms 209. For example, in the embodiment of FIG. 3A, the x-ray receptor 219 may be configured to be engaged by the second equipment perch 212b and the one or more supporting arms 209, thereby substantially restricting movement and/or retaining the x-ray receptor 219 in a substantially fixed position with respect to the working frame 202. In an additional or alternative embodiment, the x-ray assembly 400 may further comprise additional equipment components, such as, one or more cable harnesses, a power source, a computer and/or control unit, a wireless transmitter, a wireless receiver, or any other suitable equipment components as would be appreciated by one of ordinary skill in the art upon viewing this disclosure.

In an embodiment, as illustrated in FIG. 3B, the CTST 500 may be configured to provide access to one or more components (e.g., one or more sensors) disposed within the axial flowbore of the length of coiled tubing 300, for example, the CTST 500 may comprise a drilling assembly 402. In the embodiment of FIG. 3B, the drilling assembly 402 may comprise a drilling press 214. For example, in an embodiment, the drilling press 214 may comprise a cordless magnetic drill press, alternatively, a cord powered hydraulic drill press. In an embodiment, the drilling press 214 may be configured to pierce and/or to penetrate (e.g., drill one or more holes into) the exterior of the length of coiled tubing 300, thereby providing access to the axial flowbore of the length of coiled tubing 300. In an embodiment, the drill press 214 may be attachable to the servicing fixture 200 (e.g., via a connection to the first equipment perch 212a) and may be positioned adjacent to and/or about the length of coiled tubing 300. In an additional or alternative embodiment, the drilling assembly 402 may further comprise additional equipment components, such as, one or more cable harnesses, a power source, a computer and/or control unit, a wireless transmitter, a wireless receiver, or any other suitable equipment components as would be appreciated by one of ordinary skill in the art upon viewing this disclosure.

In an additional or alternative embodiment, the CTST 500 may be configured to employ any other suitable servicing tool which may be utilized to perform one or more coiled tubing servicing operations as would be appreciated by one of ordinary skill in the art upon viewing this disclosure. For example, in an embodiment, the x-ray assembly 400 and the drilling press assembly 402 may be mounted on a common assembly opposite each other and may counter balance each other.

In an embodiment, a coiled tubing servicing method utilizing a CTST, such as the CTST 500, is disclosed herein. Such a method may comprise preparing a length of coiled tubing, preparing a CTST 500, locating one or more components within the axial flowbore of the length of coiled tubing, and providing access to the one or more components within the axial flowbore of the length of coiled tubing. In an additional embodiment, the coiled tubing servicing method may further comprise disassembling the CTST 500, repositioning the CTST 500, locating one or more additional components within the axial flowbore of the length of coiled tubing, and providing access to the one or more components within the axial flowbore of the length of coiled tubing. Still further, the coiled tubing servicing method may further comprise respooling the coiled tubing, positioning the coiled tubing within a wellbore and/or casing string, and logging data from the one or more sensors of the coiled tubing.

In an embodiment, a length of coiled tubing may be prepared, for example, for the purpose of monitoring a wellbore and/or any other wellbore servicing operation. For example, in an embodiment, preparing a length of coiled tubing 300 may generally comprise the sub-steps of providing a length of coiled tubing 300, disposing one or more data conduits within the axial flowbore of the coiled tubing 300, affixing one or more components (e.g., a sensor) to the one or more data conduits, and positioning the one or more components (e.g., a sensor) within the axial flowbore of the coiled tubing 300.

In an embodiment, a length of coiled tubing 300 may be unspooled and/or extended, for example, by uncoiling the length of coiled tubing 300 onto a suitable surface (e.g., an airplane runway, a street, a field, an assembly belt, etc.). In an embodiment, the length of coiled tubing 300 may be measured and/or cut to a desired length, for example, a length associated with a desired monitoring location within a wellbore. In an embodiment, the two or more data conduits (e.g., electrical conducting wires and/or fiber-optic cables) may be passed through the axial flowbore of the length of coiled tubing 300, for example, from a heel end (e.g., an upper end, when disposed within the wellbore) toward a toe end (e.g., a lower end, when disposed within the wellbore) of the coiled tubing 300 by any suitable method. For example, in an embodiment, the two or more data conduits may be pulled through the axial flowbore of the coiled tubing 300 with a cable or by a suitable, mechanical means. In an embodiment, the two or more components (e.g., two or more sensors such as temperature and/or pressure sensors) may be attached to the two or more data conduits. For example, in an embodiment, a first sensor may be attached (e.g., via a hardwired electrical connection) to a first data conduit (e.g., a copper wire) and a second sensor may be attached (e.g., via a hardwired electrical connection) to a second wire data conduit (e.g., a copper wire). Additionally, in an embodiment, for example, following attachment of the sensors to the data conduits, the two or more data conduits and two or more sensors may be retracted (e.g., pulled) within the axial flowbore (e.g., in a direction from the toe towards the heel) of the coiled tubing 300 and/or may be positioned within the axial flowbore of the coiled tubing 300 (e.g., placed at a desired location along the length of coiled tubing 300).

In an embodiment, one or more portions of the length of coiled tubing 300 comprising one or more components (e.g., a sensor) disposed within the axial flowbore of the length of coiled tubing 300 may be marked or otherwise identified. For example, in an embodiment, an eddy current meter may be passed along the exterior of the length of coiled tubing 300 to locate the one or more sensors disposed within the axial flowbore of the length of coiled tubing 300. In an alternative embodiment, the one or more sensors may be located via retracting or pulling the sensors into the coiled tubing by a known distance measurement. In such an embodiment, the exterior of the coiled tubing 300 may be marked to indicate the gross locations of the one or more sensors. As used herein, the term "gross" refers to a range of proximity to the one or more components (e.g., a sensor), for example, within a range of about plus or minus about 3 feet (ft), 2 ft, 1 ft, 6 inches (in), 5 in, 4 in, etc.

In an embodiment, the servicing cart 100 of the CTST 500 may be positioned proximate to and/or adjacent to a portion of the length of coiled tubing 300 comprising the one or more components. In an embodiment, the portion of the coiled tubing 300 comprising the one or more components may be lifted and/or positioned onto the servicing cart 100, for example, into the pipe guides 107 of the servicing cart 100. For example, in an embodiment, the portion of coiled tubing 300 may be placed onto the servicing cart 100 via a forklift, a jack, a crane, a hoist, or any other suitable lifting methods as would be appreciated by one of ordinary skill in the art upon viewing this disclosure. Additionally, in an embodiment as illustrated in FIG. 2, the portion of coiled tubing 300 may be secured to the servicing cart 100 via the restraining mechanisms 108 (e.g., pipe clamps). In an additional or alternative embodiment, one or more supports (e.g., one or more jack stands) may be positioned adjacent to the servicing cart 100 (e.g., adjacent each end thereof) along the longitudinal axis 600, for example, for the purpose of providing additional support and/or tension relief to the length of coiled tubing 300.

In an embodiment, the servicing fixture 200 may be attached to the servicing cart 100 and/or the portion of the coiled tubing. For example, in the embodiment of FIGS. 3A-3B, the servicing fixture 200 may be joined to the coiled tubing 300 via the fixture mounts 208 (e.g., a plurality of split ring pipe hangers).

In an embodiment, an x-ray assembly 400 may be employed to precisely locate one or more components disposed within the axial flow bore of the coiled tubing 300. As used herein, the term "precisely" refers to a range of proximity to the one or more components (e.g., a sensor), for example, within a range of about plus or minus about 6 in, 5 in, 4 in, 3 in, 2 in, 1 in, 0.5 in, 0.1 in, etc. In such an embodiment, the x-ray assembly 400 may be installed onto the equipment perches 212 of the servicing fixture 200. For example, in an embodiment as illustrated in FIG. 3A, the x-ray source 218 (e.g., a non-radioactive digital x-ray source) may be attached to and/or installed onto the first equipment perch 212a and the x-ray receptor 219 may be attached to and/or installed onto the second equipment perch 212b. Additionally, in an embodiment, the x-ray receptor 219 may be further supported by the supporting arms 209. In an embodiment, the x-ray assembly 400 may be positioned along the longitudinal axis 600 of the coiled tubing 300 via the linear actuators 206a and/or the rails 206c and/or may be positioned radially about the longitudinal axis 600 of the coiled tubing 300 via the radial actuators 206b. For example, in an embodiment, the x-ray assembly 400 may be positioned adjacent to and/or proximate to a portion of the coiled tubing to be inspected, for example, as indicated by Eddy meters or the like. In an embodiment, the x-ray assembly 400 may provide an x-ray image of the interior of a portion of the coiled tubing 300, for example, for the purpose of precisely locating the one or more components disposed within the axial flowbore of the coiled tubing 300. Additionally, in an embodiment, the x-ray assembly 400 may be repositioned, as needed, to locate the one or more components disposed within the axial flowbore of the coiled tubing 300. For example, in an embodiment, the x-ray assembly 400 may iteratively locate a component disposed within the axial flowbore of the coiled tubing 300, for example, via providing an x-ray image, inspecting the x-ray image, readjusting the longitudinal and/or radial position of the x-ray assembly 400, and repeating one or more steps as needed to precisely locate the position and/or orientation of the component (e.g., the sensor). In an embodiment, the coiled tubing 300 may be marked or otherwise denoted to indicate the precise location and/or orientation of the one or more components disposed within the axial flowbore of the coiled tubing 300. In an additional or alternative embodiment, upon precisely locating the one or more components disposed within the axial flowbore of the coiled tubing 300, the x-ray assembly 400 may be removed from the servicing fixture 200.

In an embodiment, a drilling assembly 402 may be employed to provide access to the axial flow bore of the coiled tubing 300. In such an embodiment, the drilling assembly 402 may be installed onto one of the equipment perches 212 of the servicing fixture 200. For example, in an embodiment as illustrated in FIG. 3B, the drilling press 214 (e.g., a cordless magnetic drill press) may be attached to and/or installed onto the first equipment perch 212a. In an additional embodiment, a counter weight may be attached to and/or installed onto a second equipment perch 212b, for example, for the purpose of stabilizing the servicing fixture 200 from rotating radially about the longitudinal axis 600. In an embodiment, the drilling assembly 402 and/or servicing fixture 200 may remain in a previously configured position and/or orientation with respect to the coiled tubing 300. For example, in an embodiment, the previously configured position and/or orientation with respect to the coiled tubing 300 may be established and/or determined by the x-ray assembly 400 (e.g., as previously and precisely marked on the coiled tubing 300). In an additional or alternative embodiment, the drilling assembly 402 may be positioned along the longitudinal axis 600 of the coiled tubing 300 via the linear actuators 206a and/or the rails 206c and/or may be positioned radially about the longitudinal axis 600 of the coiled tubing 300 via the radial actuators 206b. For example, the drilling assembly 402 may be positioned adjacent to and/or proximate to a portion of the coiled tubing 300 to be operated on (e.g., drilled). In an embodiment, the drilling assembly 402 may provide a route of access (e.g., via drilling one or more holes) to the interior of the coiled tubing 300 and/or to the one or more components disposed within the axial flowbore of the coiled tubing 300. For example, in an embodiment, the drilling assembly 402 may be configured to drill one or more holes to a predetermined depth into the coiled tubing 300 at a precise location previously determined and marked. Additionally, in an embodiment, the drilling assembly 402 may be repositioned, as needed, to provide additional access (e.g., via drilling one or more additional holes) to the one or more components disposed within the axial bore of the coiled tubing 300 at a precise location previously determined and marked.

In an embodiment, the CTST 500 may be disassembled to perform one or more additional coiled tubing servicing operations. For example, in an embodiment, the one or more servicing tools (e.g., the x-ray assembly 400 and/or the drilling assembly 402) may be removed from the servicing fixture 200. Additionally, in an embodiment, the servicing fixture 200 may be removed from the servicing cart 100 and/or the coiled tubing 300. In an embodiment, the coiled tubing 300 may be removed from the servicing cart 100, for example, by removing the restraining mechanisms 108 and removing the coiled tubing 300 from the pipe guides 107 of the servicing cart 100. In an embodiment, where the length of coiled tubing 300 requires more than one coiled tubing servicing operations, the CTST 500 may be repositioned and a coiled tubing servicing method may be performed, similar to previously disclosed, for example, to provide fluid communication to additional sensors at additional locations along the coiled tubing 300. Additionally, in an embodiment, following servicing the coiled tubing 300, the coiled tubing 300 may be respooled and/or transported to a wellbore site. In such an embodiment, the coiled tubing 300 may be positioned within a casing string and/or wellbore and in fluid communication with a wellbore fluid, wherein sensors disposed within the coiled tubing 300 are in fluid communication with ambient wellbore conditions vie one or more holes drilled into the coiled tubing 300. For example, in an embodiment, the coiled tubing 300 may be employed to monitor one or more wellbore conditions (e.g., temperature, pressure, etc.).

In an embodiment, a CTST 500, a system comprising a CTST 500, and/or a coiled tubing servicing method employing such a system and/or CTST 500, as disclosed herein or in some portion thereof, may be advantageously employed to precisely locate one or more components within the axial flowbore of a length of coiled tubing 300 and/or to provide access to the one or more components within the axial flowbore of a length of coiled tubing 300. For example, in an embodiment, a CTST 500 provide the ability to precisely and iteratively locate one or more components within the axial flowbore via employing a coiled tubing servicing method, such as previously disclosed, thereby allowing for accurate detection and/or servicing of the coiled tubing. In an embodiment, a CTST like CTST 500 enables multiple coiled tubing servicing operations (e.g., inspecting, marking, x-raying, drilling, etc.) to be performed while securing and/or isolating at least a portion of the coiled tubing 300. In an embodiment, the CTST 500 enables servicing tools to be positioned along the longitudinal axis 600 of the coiled tubing 300 and about 360 degrees of rotation about longitudinal axis 600 of the coiled tubing 300 for performing coiled tubing servicing operations. Such methods of servicing a coiled tubing 300, as previously disclosed, may provide a way to secure a portion of the coiled tubing 300 and to operate with about 360 degrees of freedom about and/or along the longitudinal axis 600 of a length of coiled tubing 300. Conventional methods may not provide an apparatus configurable to use a plurality servicing equipment components to perform a coiled tubing servicing operation. Therefore, the methods disclosed herein provide a means by which to locate one or more components within the axial bore of a length of coiled tubing 300, to provide access to the one or more components within the axial bore of a length of coiled tubing 300, and/or to perform additional coiled tubing servicing operations, as needed.

Additional Description of the Embodiments

The following are non-limiting, specific embodiments in accordance with the present disclosure:

A first embodiment, which is a coiled tubing servicing system comprising:
  a servicing cart comprising two or more support frames;
  a length of coiled tubing supported by the servicing cart;
  a servicing fixture disposed about a portion of the length of coiled tubing adjacent the servicing cart,
wherein the servicing fixture is movable along a longitudinal axis of the length of coiled tubing and radially about the longitudinal axis of the length of coiled tubing; and
  a servicing tool coupled to the servicing fixture.

A second embodiment, which is the system of the first embodiment, wherein the servicing fixture is coupled to the servicing cart.

A third embodiment, which is the system of one of the first through the second embodiments, wherein the servicing fixture is coupled to the length of coiled tubing.

A fourth embodiment, which is the system of one of the first through the third embodiments, wherein the servicing cart is movable.

A fifth embodiment, which is the system of the fourth embodiment, wherein the servicing cart comprises wheels or casters.

A sixth embodiment, which is the system of one of the first through the fifth embodiments, wherein each of the two or more support frames of the servicing cart further comprises pipe guides and a pipe restraining mechanism.

A seventh embodiment, which is the system of one of the first through the sixth embodiments, wherein the servicing fixture further comprises a linear actuator, wherein the linear actuator positions the servicing tool along a longitudinal axis of the length of coiled tubing.

An eighth embodiment, which is the system of one of the first through the seventh embodiments, wherein the servicing fixture comprises a radial actuator, wherein the radial actuator positions the servicing tool around the longitudinal axis of the length of coiled tubing.

A ninth embodiment, which is the system of one of the first through the eighth embodiments, wherein the servicing tool comprises an x-ray assembly.

A tenth embodiment, which is the system of one of the first through the ninth embodiments, wherein the servicing tool comprises a drilling assembly.

An eleventh embodiment, which is a coiled tubing servicing method comprising:
  preparing a length of coiled tubing;
  preparing a coiled tubing servicing tool comprising the steps of:
    supporting at least a portion of the length of coiled tubing with a servicing cart comprising two or more support frames;
    disposing a servicing fixture adjacent the supported portion of the length of coiled tubing, wherein the servicing fixture is movable along a longitudinal axis of the length of coiled tubing and radially about the longitudinal axis of the length of coiled tubing; and
    coupling a servicing tool to the servicing fixture;

locating one or more components disposed within the length of coiled tubing; and providing access to the one or more components disposed within the length of coiled tubing.

A twelfth embodiment, which is the method of the eleventh embodiment, wherein preparing a length of coiled tubing comprises the steps of providing the length of coiled tubing, disposing one or more data conduits within the coiled tubing, affixing one or more components to the one or more data conduits, and positioning the one or more components within the coiled tubing.

A thirteenth embodiment, which is the method of one of the eleventh through the twelfth embodiments, wherein preparing the coiled tubing servicing tool further comprises positioning the servicing cart adjacent to the length of coiled tubing and positioning the length of coiled tubing onto the support frames of the servicing cart.

A fourteenth embodiment, which is the method of one of the eleventh through the thirteenth embodiments, wherein coupling the servicing tool to the fixture comprises attaching an x-ray assembly to the servicing fixture.

A fifteenth embodiment, which is the method of one of the eleventh through the fourteenth embodiments, wherein coupling the servicing tool to the fixture comprises attaching a drilling assembly to the servicing fixture.

A sixteenth embodiment, which is the method of one of the eleventh through the fifteenth embodiments, wherein locating one or more components disposed within the length of coiled tubing comprises the iterative steps of providing an x-ray image, inspecting the x-ray image, and adjusting the servicing fixture radially and/or longitudinally about the coiled tubing.

A seventeenth embodiment, which is the method of one of the eleventh through the sixteenth embodiments, wherein providing access to the one or more components disposed within the length of coiled tubing comprises drilling a hole of a predetermined depth into the coiled tubing.

An eighteenth embodiment, which is the method of one of the eleventh through the seventeenth embodiments, further comprising:

locating one or more components disposed within the length of coiled tubing via the iterative steps of providing an x-ray image, inspecting the x-ray image, and adjusting the servicing fixture radially and/or longitudinally about the coiled tubing;

designating the location of one or more components; and providing access to the one or more components the designated location via drilling a hole of a predetermined depth into the coiled tubing.

A nineteenth embodiment, which is a coiled tubing servicing method comprising:

preparing a length of coiled tubing;

supporting at least a portion of the length of coiled tubing with a coiled tubing servicing system;

preparing the coiled tubing servicing system, wherein the coiled tubing servicing system provides longitudinal and/or radial movement about the length of coiled tubing;

locating one or more components disposed within the length of coiled tubing;

providing access to the one or more components disposed within the length of coiled tubing.

A twentieth embodiment, which is the method of the nineteenth embodiment, wherein an x-ray assembly is attached to the servicing fixture, wherein the x-ray assembly provides an x-ray image thereby locating one or more components disposed within the length of coiled tubing.

A twenty-first embodiment, which is the method of one of the nineteenth through the twentieth embodiments, wherein a drilling assembly is attached to the servicing fixture, wherein the drilling assembly drills a hole of a predetermined depth into the coiled tubing thereby providing access to one or more components disposed within the length of coiled tubing.

A twenty-second embodiment, which is the method of one of the nineteenth through the twenty-first embodiments, further comprising:

locating one or more components disposed within the length of coiled tubing via the iterative steps of providing an x-ray image, inspecting the x-ray image, and adjusting the servicing fixture radially and/or longitudinally about the coiled tubing;

designating the location of one or more components; and providing access to the one or more components the designated location via drilling a hole of a predetermined depth into the coiled tubing.

While embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference in the Detailed Description of the Embodiments is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A coiled tubing servicing system comprising: a servicing cart comprising two or more support frames; a length of coiled tubing supported by the servicing cart; a servicing fixture disposed about a portion of the length of coiled tubing adjacent the servicing cart, wherein the servicing fixture is movable along a longitudinal axis of the length of coiled tubing and radially about the longitudinal axis of the length of coiled tubing; and a servicing tool coupled to the servicing fixture, wherein the servicing tool comprises an x-ray assembly.

2. The system of claim 1, wherein the servicing fixture is coupled to the servicing cart.

3. The system of claim 1, wherein the servicing fixture is coupled to the length of coiled tubing.

4. The system of claim 1, wherein the servicing cart is movable.

5. The system of claim 4, wherein the servicing cart comprises wheels or casters.

6. The system of claim 1, wherein each of the two or more support frames of the servicing cart further comprises pipe guides and a pipe restraining mechanism.

7. The system of claim 1, wherein the servicing fixture further comprises a linear actuator, wherein the linear actuator positions the servicing tool along a longitudinal axis of the length of coiled tubing.

8. The system of claim 1, wherein the servicing fixture comprises a radial actuator, wherein the radial actuator positions the servicing tool around the longitudinal axis of the length of coiled tubing.

9. The system of claim 1, wherein the servicing tool comprises a drilling assembly.

* * * * *